United States Patent Office 2,996,535
Patented Aug. 15, 1961

2,996,535
BASIC ESTERS OF SUBSTITUTED β-HYDROXY-PROPIONIC ACIDS AND PREPARATION THEREOF
Frederick F. Blicke, Ann Arbor, Mich., assignor to Regents of The University of Michigan, Ann Arbor, Mich., a corporation of Michigan
No Drawing. Filed June 10, 1954, Ser. No. 435,921
26 Claims. (Cl. 260—468)

This invention relates to basic esters of substituted β-hydroxypropionic acids having the formula

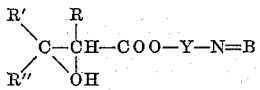

wherein R is a member of the class consisting of the cyclohexyl group and lower-alkyl-substituted cyclohexyl groups, R' is a member of the class consisting of hydrogen, lower-alkyl, cycloalkyl and lower-alkyl-substituted cycloalkyl groups, R" is a member of the group consisting of cycloalkyl, lower-alkyl-substituted cycloalkyl and lower-alkyl groups which may be joined with R' to form a cycloalkyl or lower-alkyl-substituted cycloalkyl group, Y is a lower-alkylene bridge having the free valances on different carbon atoms, and —N=B is a member of the class consisting of di-lower-alkylamino, polymethylenimino radicals having 5- to 8-membered rings and morpholino radicals.

The invention also relates to a process for the preparation of these new compounds, and to intermediates in their preparation.

These new compounds are useful in the form of their water-soluble, non-toxic salts as antispasmodic agents.

In the above general formula, R represents a cyclohexyl or a lower-alkylated cyclohexyl group. In the lower-alkylated cyclohexyl groups the alkyl groups can contain from one to about four carbon atoms and there can be from one to three such groups attached to the cyclohexyl ring. Accordingly R includes such groups as cyclohexyl, 4-methylcyclohexyl, 4-ethylcyclohexyl, 2,4-dimethylcyclohexyl, 2,4,6-trimethylcyclohexyl, 4-butylcyclohexyl, and the like.

In the above general formula, R' represents a hydrogen atom or a lower-alkyl, cycloalkyl, or lower-alkyl-substituted cycloalkyl group. The lower-alkyl groups can contain from one to about eight carbon atoms and may be straight or branched, and the cycloalkyl groups include alicyclic rings in which there are from five to eight carbon atoms in the ring. Accordingly R' includes such groups as methyl, ethyl, propyl, isopropyl, butyl, isobutyl, tertiary-butyl, amyl, isoamyl, hexyl, heptyl, octyl, cyclopentyl, 2-methylcyclopentyl, cyclohexyl, 4-methylcyclohexyl, cycloheptyl, cyclooctyl, and the like.

In the above general formula, R" represents the same groups as R', except that R" cannot be a hydrogen atom. When both R' and R" are lower-alkyl groups, they may be joined to form together with the carbon atom bearing the hydroxyl group a cycloalkyl ring or a lower-alkylated cycloalkyl ring. Accordingly the moiety R'R"C(OH)— can represent the structure

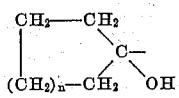

where $n$ is an integer from 1 to 4, and lower-alkylated derivatives thereof, including such groups as 1-hydroxycyclopentyl, 1-hydroxy-2-methylcyclopentyl, 1-hydroxycyclohexyl, 1-hydroxy-4-methylcyclohexyl, 1-hydroxycycloheptyl, 1-hydroxycyclooctyl, and the like.

Y represents a lower-alkylene group or bridge having the free valences on different carbon atoms, and preferably having from two to five carbon atoms, and thus Y includes the straight chain polymethylene radicals, $(CH_2)_n$, where $n$ is 2–5, and branched chain radicals including such groups as $$—CH(CH_3)CH—, \quad —CH(C_2H_5)CH—,$$
$$—C(CH_3)_2CH_2—, —CH(CH_3)CH(CH_3)—, \text{ and}$$
$$—CH(CH_3)CH_2CH_2—.$$

The —N=B portion of the molecule stands for a tertiary-amino radical of the aliphatic or cycloaliphatic type and includes di-lower-alkylamino, polymethylenimino and morpholino radicals. The alkyl groups of the di-lower-alkylamino radicals can be the same or different and each has less than about eight carbon atoms. The polymethylenimino radicals are simply cases where the alkyl groups of the di-lower-alkylamino groups are joined to produce a heterocyclic ring. The rings are 5- to 8-membered and thus include pyrrolidino, piperidino, hexamethylenimino and heptamethylenimino radicals and lower-alkylated derivatives thereof.

The new basic esters are prepared by catalytic reduction of the appropriate α-aryl-β-hydroxyalkanoic acid, having the formula

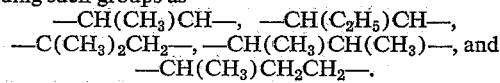

wherein Ar is phenyl or lower-alkyl-substituted phenyl, followed by esterifying the intermediate α-cyclohexyl-β-hydroxyalkanoic acid having the formula

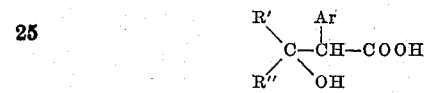

with the appropriate tertiary-aminoalkanol.

The required α-phenyl-β-hydroxyalkanoic acid is prepared from the chloromagnesium derivative of the sodium or chloromagnesium salt of phenylacetic acid by the general procedure of D. Ivanov and A. Spassov, Bull. Soc. Chim. [4] 49, 377 (1931); and D. Ivanov and N. I. Nicolov, ibid. [4] 51, 1325 (1932). In this process the chloromagnesium derivative of the salt of phenylacetic acid is reacted with a carbonyl compound R'—CO—R", and the intermediate organometallic complex is hydrolyzed to produce the desired α-phenyl-β-hydroxyalkanoic acid. If a compound is desired where one or both of R' and R" is cyclohexyl it is convenient, although not prerequisite, to employ in the Ivanov reaction the corresponding carbonyl compound wherein one or both of R' and R" are phenyl groups. In the subsequent catalytic hydrogenation reaction all of the phenyl groups are then reduced to cyclohexyl groups. If a compound is desired where R is an alkylated cyclohexyl group, the Ivanov reaction is carried out with a ring alkylated phenylacetic acid, for example, p-tolylacetic acid, 2,4-xylylacetic acid, and the like, followed by catalytic reduction of the aromatic ring.

The esterification reaction is carried out by one of the following methods:

(1) the acid, R'R"C(OH)—CH(R)—COOH, is reacted with a tertiary-aminoalkanol, HO—Y—N=B, using a strong mineral acid such as sulfuric acid as a catalyst, present in an amount greater than that necessary to neutralize the amino alcohol. The sulfate or bisulfate salt of the basic ester is formed, and the free basic ester can be obtained by addition of alkali to the reaction mixture.

(2) The acid, R'R"C(OH)—CH(R)—COOH, is heated with a tertiary-aminoalkyl halide of the formula Z—Y—N=B, where Z is halogen (preferably chlorine or bromine). The temperature at which the reactants are heated is preferably between about 50° C. and 150° C. A hydrohalide of the basic ester is obtained which can

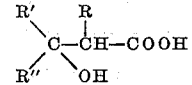

be converted to the free basic ester by the addition of alkali to the reaction mixture.

(3) A metallic salt of the acid, $$R'R''C(OH)—CH(R)—COOH$$

is heated or simply mixed with a tertiary-aminoalkyl halide, Z—Y—N=B, where Z is halogen. In this case the free basic ester is formed directly.

These new basic esters are most conveniently used in the form of water-soluble, non-toxic acid-addition or quaternary ammonium salts and these salts are within the purview of the invention. The acids which can be used to prepare acid-addition salts are preferably those which produce when combined with the free base, salts whose anions are relatively innocuous to the animal organism in therapeutic doses of the salts, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively. The quaternary ammonium salts are obtained by the addition to the free base of alkyl or aralkyl esters of inorganic acids or organic sulfonic acids, including such compounds as methyl chloride, methyl bromide, methyl iodide, ethyl bromide, propyl bromide, benzyl chloride, benzyl bromide, methyl sulfate, methyl benzenesulfonate, and methyl p-toluenesulfonate, giving the methochloride, methobromide, methiodide, ethobromide, propobromide, benzochloride, benzobromide, methosulfate, methobenzenesulfonate and metho-p-toluenesulfonate salts, respectively.

The following examples will further illustrate the invention.

EXAMPLE 1

(a) *α-Cyclohexyl-β-hydroxyvaleric acid* ($R=C_6H_{11}$, $R'=H$, $R''=C_2H_5$).—α-Phenyl-β-hydroxyvaleric acid (4.85 g., 0.025 mole), M.P. 141–142° C., was dissolved in 60 ml. of glacial acetic acid and 0.3 g. of platinum oxide catalyst was added. The mixture was hydrogenated under an initial pressure of 50 lbs. per sq. inch until the calculated amount of hydrogen had been absorbed. The catalyst was removed by filtration and the filtrate was concentrated under reduced pressure on a steam bath. The residue was recrystallized from benzene, giving 4.15 g. (83%) of α-phenyl-β-hydroxyvaleric acid, M.P. 99–101° C.

Neut. Equiv. Calcd.: 200.3. Found: 200.0.

Analysis.—Calcd. for $C_{11}H_{20}O_3$: C, 65.97; H, 10.07. Found: C, 65.82; H, 10.43.

(b) *β-Diethylaminoethyl α-cyclohexyl-β-hydroxyvalerate.*—α-Cyclohexyl-β-hydroxyvaleric acid (8.0 g., 0.04 mole), prepared as described above in part (a), was dissolved in 50 ml. of isopropyl alcohol. To this solution, which was kept under reflux, was added dropwise over a period of about two hours 5.35 g. (0.04 mole) of β-diethylaminoethyl chloride, which had previously been dissolved in its own weight of anhydrous benzene. The reaction mixture was refluxed for an additional eight hours, and then was filtered while hot to remove the small amount of tetraethylpiperazinium dichloride which formed during the course of the reaction. The cooled solution was diluted with ether until precipitation of the ester hydrochloride was initiated, and then cooled overnight in a refrigerator. The product was collected by filtration, washed with ether and recrystallized from methyl ethyl ketone, giving 8.0 g. (59%) of β-diethylaminoethyl α-cyclohexyl-β-hydroxyvalerate in the form of its hydrochloride salt, M.P. 103–105° C.

Analysis.—Calcd. for $C_{17}H_{34}O_3NCl$: C, 60.78; H, 10.21; Cl, 10.55. Found: C, 61.07; H, 10.50; Cl, 10.48.

A portion of the above hydrochloride salt was converted to the free base, β-diethylaminoethyl α-cyclohexyl-β-hydroxyvalerate, by treatment of the hydrochloride with dilute aqueous sodium hydroxide solution and extracting the free base with ether. To the ether solution of the free base was added an excess of methyl bromide and the solution was allowed to stand at room temperature until a crystalline product had formed. The latter was collected by filtration and recrystallized from an isopropyl alcohol-methyl ethyl ketone mixture, giving β-diethylaminoethyl α-cyclohexyl-β-hydroxyvalerate in the form of its methobromide salt, M.P. 125–126° C.

Analysis.—Calcd. for $C_{18}H_{36}O_3NBr$: C, 54.81; H, 9.20; N, 3.55; Br, 20.27. Found: C, 55.16; H, 9.10; N, 3.58; Br, 20.12.

EXAMPLE 2

(a) *α-Cyclohexyl-β-hydroxycaproic acid* ($R=C_6H_{11}$, $R'=H$, $R''=(CH_2)_2—CH_3$) was prepared by catalytic hydrogenation of α-phenyl-β-hydroxycaproic acid, M.P. 155–156° C., by the manipulative procedure described above in Example 1, part (a). α-Cyclohexyl-β-hydroxycaproic acid was obtained in 76% yield and had the M.P. 99–100° C. when recrystallized from benzene.

Neut. Equiv. Calcd.: 214.3. Found: 213.4.

Analysis.—Calcd. for $C_{12}H_{22}O_3$: C, 67.25; H, 10.35. Found: C, 67.00; H, 10.23.

(b) *β-Diethylaminoethyl α-cyclohexyl-β-hydroxycaproate* was prepared by esterification of α-cyclohexyl-β-hydroxycaproic acid with β-diethylaminoethyl chloride according to the manipulative procedure given above in Example 1, part (b). β-Diethylaminoethyl α-cyclohexyl-β-hydroxycaproate was obtained in the form of its hydrochloride salt in 55% yield, M.P. 100–102° C. when recrystallized from a methyl ethyl ketone-ether mixture.

Analysis.—Calcd. for $C_{18}H_{36}O_3NCl$: C, 61.78; H, 10.37; N, 4.00; Cl, 10.14. Found: C, 61.68; H, 10.51; N, 3.98; Cl, 10.14.

The minimum effective concentration ($ED_{50}$) of β-diethylaminoethyl α-cyclohexyl-β-hydroxycaproate hydrochloride as an antispasmodic against acetylcholine spasms induced in the isolated intestine was about 1 part in 3,800,000.

β-Diethylaminoethyl α-cyclohexyl-β-hydroxycaproate was obtained in the form of its methobromide salt, which had the M.P. 121–122° C. when recrystallized from an isopropyl alcohol-methyl ethyl ketone mixture.

Analysis.—Calcd. for $C_{19}H_{38}O_3NBr$: C, 55.87; H, 9.38; N, 3.43; Br, 19.57. Found: C, 55.88; H, 9.52; N, 3.41; Br, 19.43.

The $ED_{50}$ value of β-diethylaminoethyl α-cyclohexyl-β-hydroxycaproate methobromide as an antispasmodic was found to be about 1 part in 26,000,000.

EXAMPLE 3

(a) *α-Cyclohexyl-β-hydroxybutyric acid* ($R=C_6H_{11}$, $R'=H$, $R''=CH_3$) was prepared by catalytic hydrogenation of α-phenyl-β-hydroxybutyric acid, M.P. 135–136° C., by the manipulative procedure described above in Example 1, part (a). α-Cyclohexyl-β-hydroxybutyric acid was obtained in 84% yield and had the M.P. 140–142° C. when recrystallized from toluene.

Neut. Equiv. Calcd.: 186.2. Found: 186.7.

Analysis.—Calcd. for $C_{10}H_{18}O_3$: C, 64.49; H, 9.74. Found: C, 64.80; H, 9.56.

(b) *β-Diethylaminoethyl α-cyclohexyl-β-hydroxybutyrate* was prepared by esterification of α-cyclohexyl-β-hydroxybutyric acid with β-diethylaminoethyl chloride according to the manipulative procedure given above in Example 1, part (b). β-Diethylaminoethyl α-cyclohexyl-β-hydroxybutyrate when reacted with methyl iodide was obtained in the form of its methiodide salt, which had the M.P. 92–95° C. when recrystallized from an ethyl alcohol-ethyl acetate mixture.

*Analysis.*—Calcd. for $C_{17}H_{34}O_3NI$: C, 47.77; H, 8.02; N, 3.28; I, 29.70. Found: C, 47.59; H, 7.97; N, 3.23; I, 29.54.

EXAMPLE 4

(a) α - Cyclohexyl - β - hydroxy-γ-methylvaleric acid ($R=C_6H_{11}$, $R'=H$, $R''=CH(CH_3)_2$) was prepared by catalytic hydrogenation of α-phenyl-β-hydroxy-γ-methylvaleric acid, M.P. 126–127° C., by the manipulative procedure described above in Example 1, part (a). α-Cyclohexyl-β-hydroxy-γ-methylvaleric acid was obtained in 79% yield and had the M.P. 119–121° C. when recrystallized from benzene.

Neut. Equiv. Calcd.: 214.3. Found: 214.8.

*Analysis.*—Calcd. for $C_{12}H_{22}O_3$: C, 67.25; H, 10.35. Found: C, 67.55; H, 10.49.

(b) β-Diethylaminoethyl α-cyclohexyl-β-hydroxy-γ-methylvalerate was prepared by esterification of α-cyclohexyl-β-hydroxy-γ-methylvaleric acid with β-diethylaminoethyl chloride according to the manipulative procedure given above in Example 1, part (b). β-Diethylaminoethyl α-cyclohexyl-β-hydroxy-γ-methylvalerate was obtained in the form of its hydrochloride salt in 66% yield, M.P. 139–141° C. when recrystallized from an isopropyl alcohol-acetone mixture.

*Analysis.*—Calcd. for $C_{18}H_{36}O_3NCl$: C, 61.78; H, 10.37; N, 4.00; Cl, 10.14. Found: C, 61.72; H, 10.44; N, 3.98; Cl, 10.28.

The $ED_{50}$ value of β-diethylaminoethyl α-cyclohexyl-β-hydroxy-γ-methylvalerate hydrochloride as an antispasmodic was found to be about 1 part in 2,100,000.

β-Diethylaminoethyl α-cyclohexyl-β-hydroxy-γ-methylvalerate was obtained in the form of its methobromide salt, which had the M.P. 190–192° C. (dec.) when recrystallized from an isopropyl alcohol-acetone mixture.

*Analysis.*—Calcd. for $C_{19}H_{38}O_3NBr$: C, 55.87; H, 9.38; N, 3.43; Br, 19.57. Found: C, 55.74; H, 9.36; N, 3.39; Br, 19.46.

The $ED_{50}$ value of β-diethylaminoethyl α-cyclohexyl-β-hydroxy-γ-methylvalerate methobromide as an antispasmodic was found to be about 1 part in 7,400,000.

EXAMPLE 5

(a) α-Cyclohexyl-β-hydroxypelargonic acid ($R=C_6H_{11}$, $R'=H$, $R''=(CH_2)_5CH_3$) was prepared by catalytic hydrogenation of α-phenyl-β-hydroxypelargonic acid, M.P. 109–110° C., by the manipulative procedure described above in Example 1, part (a). α-Cyclohexyl-β-hydroxypelargonic acid was obtained in 81% yield and had the M.P. 93–94° C. when recrystallized from toluene.

Neut. Equiv. Calcd.: 256.4. Found: 256.1.

*Analysis.*—Calcd. for $C_{15}H_{28}O_3$: C, 70.27; H, 11.01. Found: C, 70.39; H, 11.25.

(b) β - Diethylaminoethyl α-cyclohexyl-β-hydroxypelargonate was prepared by esterification of α-cyclohexyl-β-hydroxypelargonic acid with β-diethylaminoethyl chloride according to the manipulative procedure given above in Example 1, part (b). β-Diethylaminoethyl α-cyclohexyl-β-hydroxypelargonate was obtained in the form of its hydrochloride salt in 68% yield, M.P. 109–111° C. when recrystallized from methyl ethyl ketone.

*Analysis.*—Calcd. for $C_{21}H_{42}O_3NCl$: C, 64.34; H, 10.80; N, 3.57; Cl, 9.04. Found: C, 64.43; H, 10.77; N, 3.61; Cl, 8.95.

β-Diethylaminoethyl α-cyclohexyl - β - hydroxypelargonate was obtained in the form of its methobromide salt, which had the M.P. 100–103° C. when recrystallized from an isopropyl alcohol-ether mixture.

*Analysis.*—Calcd. for $C_{22}H_{44}O_3NBr$: C, 58.65; H, 9.85; N, 3.11; Br, 17.74. Found: C, 58.37; H, 9.84; N, 3.08; Br, 17.65.

EXAMPLE 6

(a) α-Cyclohexy-β-hydroxycaprylic acid ($R=C_6H_{11}$, $R'=H$, $R''=(CH_2)_4CH_3$) was prepared by catalytic hydrogenation of α-phenyl-β-hydroxycaprylic acid, M.P. 110–111° C., by the manipulative procedure described above in Example 1, part (a). α-Cyclohexyl-β-hydroxycaprylic acid was obtained in 88% yield and had the M.P. 98–99° C. when recrystallized from benzene.

Neut. Equiv. Calcd.: 242.3. Found: 241.5.

*Analysis.*—Calcd. for $C_{14}H_{26}O_3$: C, 69.38; H, 10.81. Found: C, 69.28; H, 10.71.

(b) β - Diethylaminoethyl α-cyclohexyl-β-hydroxycaprylate was prepared by esterification of α-cyclohexyl-β-hydroxycaprylic acid with β-diethylaminoethyl chloride according to the manipulative procedure given above in Example 1, part (b). β-Diethylaminoethyl α-cyclohexyl-β-hydroxycaprylate was obtained in the form of its hydrochloride salt in 80% yield, M.P. 105–107° C. when recrystallized from methyl ethyl ketone.

*Analysis.*—Calcd. for $C_{20}H_{40}O_3NCl$: C, 63.54; H, 10.67; N, 3.71; Cl, 9.38. Found: C, 63.56; H, 10.82; N, 3.77; Cl, 9.29.

β - Diethylaminoethyl α-cyclohexyl-β-hydroxycaprylate was obtained in the form of its methobromide salt, which had the M.P. 101–103° C. when recrystallized from an acetone-ether mixture.

*Analysis.*—Calcd. for $C_{21}H_{42}O_3NBr$: C, 57.78; H, 9.70; N, 3.21; Br, 18.31. Found: C, 58.03; H, 9.91; N, 3.19; Br, 18.10.

EXAMPLE 7

(a) α,β - Dicyclohexyl - β - hydroxypropionic acid ($R=C_6H_{11}$, $R'=H$, $R''=C_6H_{11}$) was prepared by catalytic hydrogenation of α,β-diphenyl-β-hydroxypropionic acid, M.P. 173–174° C. by the manipulative procedure described above in Example 1, part (a), except that the reduction was allowed to continue until sufficient hydrogen had been taken up to reduce both phenyl rings. α,β-Dicyclohexyl-β-hydroxypropionic acid was obtained in 89% yield and had the M.P. 184–186° C. when recrystallized from toluene.

Neut. Equiv. Calcd.: 254.4. Found: 253.4.

*Analysis.*—Calcd. for $C_{15}H_{26}O_3$: C, 70.82; H, 10.30. Found: C, 70.63; H, 10.02.

(b) β-Diethylaminoethyl α,β-dicyclohexyl-β-hydroxypropionate was prepared by esterification of α,β-dicyclohexyl-β-hydroxypropionic acid with β-diethylaminoethyl chloride according to the manipulative procedure given above in Example 1, part (b). β-Diethylaminoethyl α,β-dicyclohexyl-β-hydroxypropionate was obtained in the form of its hydrochloride salt in 80% yield, M.P. 166–168° C. when recrystallized from isopropyl alcohol.

*Analysis.*—Calcd. for $C_{21}H_{40}O_3NCl$: C, 64.68; H, 10.34; N, 3.59; Cl, 9.09. Found: C, 64.53; H, 10.50; N, 3.55; Cl, 8.98.

The $ED_{50}$ value of β-diethylaminoethyl α,β-dicyclohexyl-β-hydroxypropionate hydrochloride as an antispasmodic was found to be about 1 part in 1,800,000.

β-Diethylaminoethyl α,β-dicyclohexyl - β - hydroxypropionate was obtained in the form of its methobromide salt, which had the M.P. 135–138° C. when recrystallized from an ethyl alcohol-ether mixture.

*Analysis.*—Calcd. for $C_{22}H_{42}O_3NBr$: C, 58.92; H, 9.44; N, 3.12; Br, 17.82. Found: C, 58.90; H, 9.50; N, 3.08; Br, 17.78.

EXAMPLE 8

(a) α-Cyclohexyl - β - hydroxy - β - methylbutyric acid ($R=C_6H_{11}$, $R'=CH_3$, $R''=CH_3$) was prepared by catalytic hydrogenation of α-phenyl-β-hydroxy-β-methylbutyric acid, M.P. 93–95° C., by the manipulative procedure described above in Example 1, part (a). α-Cyclohexyl-β-hydroxy-β-methylbutyric acid was obtained in 93% yield and had the M.P. 105–106° C. when recrystallized from benzene.

Neut. Equiv. Calcd.: 200.3. Found: 200.6.

*Analysis.*—Calcd. for $C_{11}H_{20}O_3$: C, 65.97; H, 10.07. Found: C, 65.76; H, 10.14.

(b) β-Diethylaminoethyl α-cyclohexyl - β - hydroxy-β-methylbutyrate was prepared by esterification of α-cyclohexyl-β-hydroxy-β-methylbutyric acid with β-diethylaminoethyl chloride according to the manipulative procedure given above in Example 1, part (b). β-Diethylaminoethyl α-cyclohexyl-β-hydroxy-β-methylbutyrate was obtained in the form of its hydrochloride salt in 76% yield, M.P. 139–141° C. when recrystallized from an isopropyl alcohol-methyl ethyl ketone mixture.

Analysis.—Calcd. for $C_{17}H_{34}O_3NCl$: C, 60.78; H, 10.21; N, 4.17; Cl, 10.55. Found: C, 61.16; H, 10.35; N, 4.14; Cl, 10.47.

The $ED_{50}$ value of β-diethylaminoethyl α-cyclohexyl-β-hydroxy-β-methylbutyrate as an antispasmodic was found to be about 1 part in 2,500,000.

β-Diethylaminoethyl α-cyclohexyl-β-hydroxy-β-methylbutyrate was obtained in the form of its methobromide salt, which had the M.P. 128–130° C. when recrystallized from acetone.

Analysis.—Calcd. for $C_{18}H_{36}O_3NBr$: C, 54.81; H, 9.20; N, 3.55; Br, 20.27. Found: C, 55.02; H, 9.17; N, 3.57; Br, 20.18.

EXAMPLE 9

(a) α-Cyclohexyl-β-hydroxy-β-ethylvaleric acid (R=$C_6H_{11}$, R'=$C_2H_5$, R''=$C_2H_5$) was prepared by catalytic hydrogenation of α-phenyl-β-hydroxy-β-ethylvaleric acid, M.P. 151–152° C. by the manipulative procedure described above in Example 1, part (a). α-Cyclohexyl-β-hydroxy-β-ethylvaleric acid was obtained in 82% yield and had the M.P. 84–86° C. when recrystallized from benzene.

Neut. Equiv. Calcd.: 228.3. Found: 229.1.

Analysis.—Calcd. for $C_{13}H_{24}O_3$: C, 68.39; H, 10.59. Found: C, 68.37; H, 10.56.

(b) β-Diethylaminoethyl α-cyclohexyl-β-hydroxy-β-ethylvalerate was prepared by esterification of α-cyclohexyl-β-hydroxy-β-ethylvaleric acid with β-diethylaminoethyl chloride according to the manipulative procedure given above in Example 1, part (b). β-Diethylaminoethyl α-cyclohexyl-β-hydroxy-β-ethylvalerate was obtained in the form of its hydrochloride salt in 68% yield, M.P. 129–131° C. when recrystallized from an isopropyl alcohol-ether mixture.

Analysis.—Calcd. for $C_{19}H_{38}O_3NCl$: C, 62.69; H, 10.53; N, 3.85; Cl, 9.74. Found: C, 62.62; H, 10.78; N, 3.81; Cl, 9.71.

β-Diethylaminoethyl α-cyclohexyl-β-hydroxy-β-ethylvalerate was obtained in the form of its methobromide salt, which had the M.P. 150–152° C. when recrystallized from acetone.

Analysis.—Calcd. for $C_{20}H_{40}O_3NBr$: C, 56.87; H, 9.54; N, 3.31; Br, 18.92. Found: C, 56.63; H, 9.54; N, 3.34; Br, 18.78.

EXAMPLE 10

(a) α-Cyclohexyl-β-hydroxy-β-methylvaleric acid (R=$C_6H_{11}$, R'=$C_2H_5$, R''=$CH_3$) was prepared by catalytic hydogenation of a α-phenyl-β-hydroxy-β-methylvaleric acid, M.P. 92–94° C. by the manipulative procedure described above in Example 1, part (a). α-Cyclohexyl-β-hydroxy-β-methylvaleric acid was obtained in 72% yield and had the M.P. 89–90° C. when recrystallized from a benzene-petroleum ether (B.P. 60–75° C.) mixture.

Neut. Equiv. Calcd.: 214.3. Found: 214.7.

Analysis.—Calcd. for $C_{12}H_{22}O_3$: C, 67.25; H, 10.35. Found: C, 67.46; H, 10.46.

(b) β-Diethylaminoethyl α-cyclohexyl-β-hydroxy-β-methylvalerate was prepared by esterification of α-cyclohexyl-β-hydroxy-β-methylvaleric acid with β-diethylaminoethyl chloride according to the manipulative procedure given above in Example 1, part (b). β-Diethylaminoethyl α-cyclohexyl-β-hydroxy-β-methylvalerate was obtained in the form of its hydrochloride salt in 67% yield, M.P. 116–117° C. when recrystallized from methyl ethyl ketone.

Analysis.—Calcd. for $C_{18}H_{36}O_3NCl$: C, 61.78; H, 10.37; N, 4.00; Cl, 10.14. Found: C, 61.74; H, 10.53; N, 4.02; Cl, 10.08.

β-Diethylaminoethyl α-cyclohexyl-β-hydroxy-β-methylvalerate was obtained in the form of its methobromide salt, which had the M.P. 142–144° C. when recrystallized from an ethyl alcohol-ether mixture.

Analysis.—Calcd. for $C_{19}H_{38}O_3NBr$: C, 55.87; H, 9.38; N, 3.43; Br, 19.57. Found: C, 55.80; H, 9.42; N, 3.41; Br, 19.36.

EXAMPLE 11

(a) α,β-Dicyclohexyl-β-hydroxybutyric acid (R=$C_6H_{11}$, R'=$CH_3$, R''=$C_6H_{11}$) was prepared by catalytic hydrogenation of α,β-diphenyl-β-hydroxybutyric acid, M.P. 185–187° C. by the manipulative procedure described above in Example 1, part (a), except that the reduction was allowed to continue until sufficient hydrogen had been taken up to reduce both phenyl rings. α,β-Dicyclohexyl-β-hydroxybutyric acid was obtained in 72% yield and had the M.P. 141–143° C. when recrystallized from toluene.

Neut. Equiv. Calcd.: 268.4. Found: 268.0.

Analysis.—Calcd. for $C_{16}H_{28}O_3$: C, 71.60; H, 10.52. Found: C, 71.35; H, 10.60.

(b) β-Diethylaminoethyl α,β-dicyclohexyl-β-hydroxybutyrate was prepared by esterification of α,β-dicyclohexyl-β-hydroxybutyric acid with β-diethylaminoethyl chloride according to the manipulative procedure given above in Example 1, part (b). β-Diethylaminoethyl α,β-dicyclohexyl-β-hydroxybutyrate was obtained in the form of its hydrochloride salt in 66% yield, M.P. 147–149° C. when recrystallized from methyl ethyl ketone.

Analysis.—Calcd. for $C_{22}H_{42}O_3NCl$: C, 65.40; H, 10.48; N, 3.47; Cl, 8.77. Found: C, 65.44; H, 10.44; N, 3.46; Cl, 8.89.

β-Diethylaminoethyl α,β-dicyclohexyl-β-hydroxybutyrate was obtained in the form of its methobromide salt, which had the M.P. 194–195° C. (dec.) when recrystallized from an ethyl alcoholether mixture.

Analysis.—Calcd. for $C_{23}H_{44}O_3NBr$: C, 59.72; H, 9.59; N, 3.03; Br, 17.28. Found: C, 59.42; H, 9.68; N, 2.97; Br, 17.15.

EXAMPLE 12

(a) α-Cyclohexyl-β-hydroxy-β-propylcaproic acid (R=$C_6H_{11}$, R'=$C_3H_7$, R''=$C_3H_7$) was prepared by catalytic hydrogenation of α-phenyl-β-hydroxy-β-propylcaproic acid, M.P. 176–177° C. by the manipulative procedure described above in Example 1, part (a). α-Cyclohexyl-β-hydroxy-β-propylcaproic acid was obtained in 91% yield and had the M.P. 116–118° C. when recrystallized from benzene.

Neut. Equiv. Calcd.: 256.4. Found: 255.4.

Analysis.—Calcd. for $C_{15}H_{28}O_3$: C, 70.27; H, 11.01. Found: C, 70.59; H, 10.97.

(b) β-Diethylaminoethyl α-cyclohexyl-β-hydroxy-β-propylcaproate was obtained by esterification of α-cyclohexyl-β-hydroxy-β-propylcaproic acid with β-diethylaminoethyl chloride according to the manipulative procedure given above in Example 1, part (b). β-Diethylaminoethyl α-cyclohexyl-β-hydroxy-β-propylcaproate was obtained in the form of its hydrochloride salt in 67% yield, M.P. 123–125° C. when recrystallized from methyl ethyl ketone.

Analysis.—Calcd. for $C_{21}H_{42}O_3NCl$: C, 64.34; H, 10.80; N, 3.57; Cl, 9.04. Found: C, 64.48; H, 10.83; N, 3.56; Cl, 8.98.

β-Diethylaminoethyl α-cyclohexyl-β-hydroxy-β-propylcaproate was obtained in the form of its methobromide salt, which had the M.P. 183–185° C. when recrystallized from an ethyl alcoholisopropyl alcohol mixture.

Analysis.—Calcd. for $C_{22}H_{44}O_3NBr$: C, 58.65; H, 9.85; N, 3.11; Br, 17.74. Found: C, 58.80; H, 10.07; N, 3.07; Br, 17.59.

EXAMPLE 13

(a) α-Cyclohexyl-α-(1-hydroxycyclopentyl)acetic acid (R=$C_6H_{11}$, R' and R''= —$CH_2(CH_2)_2CH_2$—) was prepared by catalytic hydrogenation of α-phenyl-α-(1-hydroxycyclopentyl)acetic acid, M.P. 99–100° C. by the manpulative procedure described above in Example 1, part (a). α-Cyclohexyl-α - (1-hydroxycyclopentyl)acetic acid was obtained in 66% yield and had the M.P. 109–110° C. when recrystallized from a toluene-petroleum ether (B.P. 60–75° C.) mixture.

Neut. Equiv. Calcd.: 226.3. Found: 226.7.

Analysis.—Calcd. for $C_{13}H_{22}O_3$: C, 68.99; H, 9.80. Found: C, 68.91; H, 10.01.

(b) β - Diethylaminoethyl α-cyclohexyl - α-(1-hydroxycyclopentyl)-acetate was prepared by esterification of α-cyclohexyl - α - (1-hydroxycyclopentyl)acetic acid with β-diethylaminoethyl chloride according to the manipulative procedure given above in Example 1, part (b). β-Diethylaminoethyl α-cyclohexyl-α - (1-hydrocyclopentyl) acetate was obtained in the form of its hydrochloride salt in 41% yield, M.P. 125–128° C. when recrystallized from an n-butyl alcohol-ether mixture.

Analysis.—Calcd. for $C_{19}H_{36}O_3NCl$: C, 63.04; H, 10.03; N, 3.87; Cl, 9.80. Found: C, 63.15; H, 10.07; N, 4.09; Cl, 10.01.

β-Diethylaminoethyl α - cyclohexyl-α-(1-hydroxycyclopentyl)acetate hydrochloride was found to have an $ED_{50}$ value as an antispasmodic of about 1 part in 32,000,000.

β-Diethylaminoethyl α - cyclohexyl-α-(1-hydroxycyclopentyl)acetate was obtained in the form of its methobromide salt, which had the M.P. 112–114° C. when recrystallized from an ethyl acetate-ether mixture.

Analysis.—Calcd. for $C_{20}H_{38}O_3NBr$: C, 57.15; H, 9.10; N, 3.33; Br, 19.02. Found: C, 56.89; H, 9.23; N, 3.27; Br, 19.20.

β-Diethylaminoethyl α - cyclohexyl-α-(1-hydroxycyclopentyl)acetate methobromide was found to have an $ED_{50}$ value as an antispasmodic of about 1 part in 93,000,000.

EXAMPLE 14

(a) α-Cyclohexyl - α - (1 - hydroxycyclohexyl)acetic acid (R=$C_6H_{11}$, R' and R''= —$CH_2(CH_2)_3CH_2$—) was prepared by catalytic hydrogenation of α-phenyl-α-(1-hydroxycyclohexyl)acetic acid, M.P. 139–140° C. by the manipulative procedure described above in Example 1, part (a). α-Cyclohexyl - α - (1 - hydroxycyclohexyl)-acetic acid was obtained in 85% yield and had the M.P. 152–154° C. when recrystallized from toluene.

Neut. Equiv. Calcd.: 240.4. Found: 239.3.

Analysis.—Calcd. for $C_{14}H_{24}O_3$: C, 69.97; H, 10.07. Found: C, 70.13; H, 10.09.

(b) β - Diethylaminoethyl α-cyclohexyl-α-(1-hydroxycyclohexyl)-acetate was prepared by esterification of α-cyclohexyl - α - (1-hydroxycyclohexyl)acetic acid with β-diethylaminoethyl chloride according to the manipulative procedure given above in Example 1, part (b). β-diethylaminoethyl α-cyclohexyl - α - (1-hydroxycyclohexyl)acetate was obtained in the form of its hydrochloride salt in 82% yield, M.P. 176–178° C. when recrystallized from isopropyl alcohol.

Analysis.—Calcd. for $C_{20}H_{38}O_3NCl$: C, 63.89; H, 10.19; N, 3.73; Cl, 9.43. Found: C, 63.92; H, 10.42; N, 3.70; Cl, 9.37.

β-Diethylaminoethyl α - cyclohexyl - α - (1-hydroxycyclohexyl)acetate was found to have an $ED_{50}$ value as an antispasmodic of about 1 part in 6,500,000.

β-Diethylaminoethyl α - cyclohexyl-α-(1-hydroxycyclohexyl)acetate was obtained in the form of its methobromide salt, which had the M.P. 136–138° C. when recrystallized from an ethyl alcohol-ether mixture.

Analysis.—Calcd. for $C_{21}H_{40}O_3NBr$: C, 58.05; H, 9.28; N, 3.22; Br, 18.40. Found: C, 57.87; H, 9.41; N, 3.19; Br, 18.29.

β-Diethylaminoethyl α - cyclohexyl - α - (1-hydroxycyclohexyl)acetate was found to have an $ED_{50}$ value as an antispasmodic of about 1 part in 42,000,000.

EXAMPLE 15

γ-Dimethylaminopropyl α - cyclohexyl - α - (1-hydroxycyclohexyl)acetate was prepared by esterification of α-cyclohexyl - α - (1-hydroxycyclohexyl)acetic acid with γ-dimethylaminopropyl chloride according to the manipulative procedure given above in Example 1, part (b). γ-Dimethylaminopropyl α-cyclohexyl - α - (1-hydroxycyclohexyl)acetate was obtained in the form of its hydrochloride salt in 64% yield, M.P. 151–153° C. when recrystallized from an isopropyl alcohol-methyl ethyl ketone mixture.

Analysis.—Calcd. for $C_{19}H_{36}O_3NCl$: C, 63.05; H, 10.02; N, 3.87; Cl, 9.80. Found: C, 62.80; H, 10.09; N, 3.89; Cl, 9.71.

EXAMPLE 16

β-Piperidinoethyl α - cyclohexyl - α - (1-hydroxycyclohexyl)acetate was prepared by esterification of α-cyclohexyl - α - (1 - hydroxycyclohexyl)acetic acid with β-piperidinoethyl chloride according to the manipulative procedure given above in Example 1, part (b). β-Piperidinoethyl α-cyclohexyl-α-(1 - hydroxycyclohexyl)acetate was obtained in the form of its hydrochloride salt in 77% yield, M.P. 195–196° C. when recrystallized from isopropyl alcohol-methyl ethyl ketone.

Analysis.—Calcd. for $C_{21}H_{38}O_3NCl$: C, 65.01; H, 9.87; N, 3.61; Cl, 9.14. Found: C, 65.07; H, 10.03; N, 3.57; Cl, 9.01.

EXAMPLE 17

(a) α - Cyclohexyl-α-(1-hydroxy-4-methylcyclohexyl)-acetic acid (R=$C_6H_{11}$, R' and R''= –$CH_2CH_2CH(CH_3)CH_2CH_2$–) was prepared by catalytic hydrogenation of α-phenyl-α-(1-hydroxy-4-methylcyclohexyl)acetic acid, M.P. 177–178° C., by the manipulative procedure described above in Example 1, part (a). α-Cyclohexyl-α-(1-hydroxy-4-methylcyclohexyl)acetic acid was obtained in 73% yield and had the M.P. 159–160° C. when recrystallized from a methyl ethyl ketone-petroleum ether (B.P. 60–75° C.) mixture.

Neut. Equiv. Calcd.: 254.4. Found: 254.0.

Analysis.—Calcd. for $C_{15}H_{26}O_3$: C, 70.82; H, 10.30. Found: C, 70.83; H, 10.41.

(b) β-Diethylaminoethyl α-cyclohexyl-α-(1-hydroxy-4-methylcyclohexyl)acetate was prepared by esterification of α-cyclohexyl-α-(1-hydroxy-4-methylcyclohexyl)acetic acid with β-diethylamino ethyl chloride according to the manipulative procedure given above in Example 1, part (b). β-Diethylaminoethyl α-cyclohexyl-α-(1-hydroxy-4-methylcyclohexyl)acetate was obtained in the form of its hydrochloride salt in 77% yield, M.P. 183–185° C. when recrystallized from isopropyl alcohol.

Analysis.—Calcd. for $C_{21}H_{40}O_3NCl$: C, 64.68; H, 10.34; N, 3.59; Cl, 9.09. Found: C, 64.69; H, 10.25; N, 3.55; Cl, 9.16.

β - Diethylaminoethyl α - cyclohexyl - α - (1-hydroxy-4-methylcyclohexyl)acetate hydrochloride was found to have an $ED_{50}$ value as an antispasmodic of about 1 part in 1,900,000.

β - Diethylaminoethyl α - cyclohexyl-α-(1-hydroxy - 4-methylcyclohexyl)acetate was obtained in the form of its methobromide salt, which had the M.P. 155–157° C. when recrystallized from an acetone-ether mixture.

Analysis.—Calcd. for $C_{22}H_{42}O_3NBr$: C, 58.92; H, 9.44; N, 3.12; Br, 17.82. Found: C, 59.20; H, 9.42; N, 3.07; Br, 17.71.

β - Diethylaminoethyl α - cyclohexyl-α-(1-hydroxy - 4-methylcyclohexyl)acetate methobromide was found to have an $ED_{50}$ value as an antispasmodic of about 1 part in 14,000,000.

EXAMPLE 18

(a) α - Cyclohexyl - (1-hydroxy-3-methylcyclohexyl)-acetic acid (R=$C_6H_{11}$, R' and R''= –$CH_2CH(CH_3)CH_2CH_2CH_2$–)

was prepared by catalytic hydrogenation of α-phenyl-α-(1-hydroxy-3-methylcyclohexyl)acetic acid, M.P. 194–195° C. by the manipulative procedure described above in Example 1, part (a). α-Cyclohexyl-α-(1-hydroxy-3-methylcyclohexyl)acetic acid was obtained in 71% yield and had the M.P. 142–144° C. when recrystallized from methyl ethyl ketone.

Neut. Equiv. Calcd: 254.4. Found: 254.9.

Analysis.—Calcd. for $C_{15}H_{26}O_3$: C, 70.82; H, 10.30. Found: C, 70.63; H, 10.36.

(b) β-Diethylaminoethyl α-cyclohexyl-α-(1-hydroxy-3-methylcyclohexyl)acetate was prepared by esterification of α-cyclohexyl-α-(1-hydroxy-3-methylcyclohexyl)acetic acid with β-diethylaminoethyl chloride according to the manipulative procedure given above in Example 1, part (b). β-Diethylaminoethyl α-cyclohexyl-α-(1-hydroxy-3-methylcyclohexyl)acetate was obtained in the form of its hydrochloride salt in 68% yield, M.P. 159–161° C. when recrystallized from methyl ethyl ketone.

Analysis.—Calcd. for $C_{21}H_{40}O_3NCl$: C, 64.68; H, 10.34; N, 3.59; Cl, 9.09. Found: C, 64.78; H, 10.35; N, 3.57; Cl, 9.01.

β-Diethylaminoethyl α-cyclohexyl-α-(1-hydroxy-3-methylcyclohexyl)acetate was obtained in the form of its methobromide salt, which had the M.P. 149–151° C. when recrystallized from an ethyl alcohol-ether mixture.

Analysis.—Calcd. for $C_{22}H_{42}O_3NBr$: C, 58.92; H, 9.44; N, 3.12; Br, 17.82. Found: C, 58.67; H, 9.65; N, 3.08; Br, 17.63.

EXAMPLE 19

(a) α-Cyclohexyl-α-(1-hydroxycycloheptyl)acetic acid ($R=C_6H_{11}$, R' and $R''=-CH_2(CH_2)_4CH_2-$) was prepared by catalytic hydrogenation of α-phenyl-α-(1-hydroxycycloheptyl)acetic acid, M.P. 148° C., by the manipulative procedure described above in Example 1, part (a). α-Cyclohexyl-α-(1-hydroxycycloheptyl)acetic acid was obtained in 63% yield and had the M.P. 122–124° C. when recrystallized from a toluene-petroleum ether (B.P. 60–75° C.) mixture.

Neut. Equiv. Calcd.: 254.4. Found: 252.6.

Analysis.—Calcd. for $C_{15}H_{26}O_3$: C, 70.82; H, 10.30. Found: C, 70.82; H, 10.38.

(b) β-Diethylaminoethyl α-cyclohexyl-α-(1-hydroxycycloheptyl)-acetate was prepared by esterification of α-cyclohexyl-α-(1-hydroxycycloheptyl)acetic acid with β-diethylaminoethyl chloride according to the manipulative procedure given above in Example 1, part (b). β-Diethylaminoethyl α-cyclohexyl-α-(1-hydroxycycloheptyl)acetate was obtained in the form of its hydrochloride salt in 40% yield, M.P. 195–197° C. when recrystallized from an n-butyl alcohol-ether mixture.

Analysis.—Calcd. for $C_{21}H_{40}O_3NCl$; C, 64.68; H, 10.34; N, 3.59; Cl, 9.09. Found: C, 64.71; H, 10.36; N, 3.64; Cl, 9.02.

β-Diethylaminoethyl α-cyclohexyl-α-(1-hydroxycycloheptyl)acetate hydrochloride was found to have an $ED_{50}$ value as an antispasmodic of about 1 part in 7,500,000.

β-Diethylaminoethyl α-cyclohexyl-α-(1-hydroxycycloheptyl)acetate was obtained in the form of its methobromide salt, which had the M.P. 139–141° C. when recrystallized from ethyl alcohol.

Analysis.—Calcd. for $C_{22}H_{42}O_3NBr$: C, 58.91; H, 9.44; N, 3.12; Br, 17.82. Found: C, 58.76; H, 9.46; N, 2.98; Br, 17.95.

β-Diethylaminoethyl α-cyclohexyl-α-(1-hydroxycycloheptyl)acetate methobromide was found to have an $ED_{50}$ value as an antispasmodic of about 1 part in 45,000,000.

EXAMPLE 20

(a) α-Cyclohexyl-α-(1-hydroxycyclooctyl)acetic acid ($R=C_6H_{11}$, R' and $R''=-CH_2(CH_2)_5CH_2-$) was prepared by catalytic hydrogenation of α-phenyl-α-(1-hydroxycyclooctyl)acetic acid, M.P. 162–163° C., by the manipulative procedure described above in Example 1, part (a). α-Cyclohexyl-α-(1-hydroxycyclooctyl)acetic acid was obtained in 67% yield and had the M.P. 147–149° C. when recrystallized from toluene.

Neut. Equiv. Calcd.: 268.4. Found: 268.0.

Analysis.—Calcd. for $C_{16}H_{28}O_3$: C, 71.60; H, 10.52. Found: C, 71.53; H, 10.53.

(b) β-Diethylaminoethyl α-cyclohexyl-α-(1-hydroxycyclooctyl)-acetate was prepared by esterification of α-cyclohexyl-α-(1-hydroxycyclooctyl)acetic acid with β-diethylaminoethyl chloride according to the the manipulative procedure given above in Example 1, part (b). β-Diethylaminoethyl α-cyclohexyl-α-(1-hydroxycyclooctyl)acetate was obtained in the form of its hydrochloride salt in 74% yield, M.P. 175–176° C. when recrystallized from isopropyl alcohol.

Analysis.—Calcd. for $C_{22}H_{42}O_3NCl$: C, 65.40; H, 10.48; N, 3.47; Cl, 8.77. Found: C, 65.18; H, 10.25; N, 3.46; Cl, 8.75.

β-Diethylaminoethyl α-cyclohexyl-α-(1-hydroxycyclooctyl)acetate was obtained in the form of its methobromide salt, which had the M.P. 139–142° C. when recrystallized from an isopropyl alcohol-ether mixture.

Analysis.—Calcd. for $C_{23}H_{44}O_3NBr$: C, 59.72; H, 9.59; N, 3.03; Br, 17.28. Found: C, 59.49; H, 9.65; N, 3.06; Br, 17.12.

EXAMPLE 21

(a) α,β,β-Tricyclohexyl-β-hydroxypropionic acid ($R=C_6H_{11}$, $R'=C_6H_{11}$, $R''=C_6H_{11}$) can be prepared by catalytic hydrogenation of α,β,β-triphenyl-β-hydroxypropionic acid, M.P. 206–207° C. by the manipulative precedure described above in Example 1, part (a), allowing for uptake of hydrogen sufficient to reduce all three phenyl groups.

(b) β-Morpholinoethyl α,β,β-tricyclohexyl-β-hydroxypropionate can be prepared by esterification of α,β,β-tricyclohexyl-β-hydroxypropionic acid with β-morpholinoethyl chloride according to the manipulative procedure given above in Example 1, part (b).

EXAMPLE 22

(a) α-Cyclohexyl-β-hydroxy-β-isopropyl-γ-methylvaleric acid ($R=C_6H_{11}$, $R'=CH(CH_3)_2$, $R''=CH(CH_3)_2$) can be prepared by catalytic hydrogenation of α-phenyl-β-hydroxy-β-isopropyl-γ-methylvaleric acid, M.P. 156–157° C. by the manipulative procedure described above in Example 1, part (a).

(b) 5-dimethylaminopentyl α-cyclohexyl-β-hydroxy-β-isopropyl-γ-methylvalerate can be prepared by esterification of α-cyclohexyl-β-hydroxy-β-isopropyl-γ-methylvaleric acid with 5-dimethylaminopentyl chloride according to the manipulative procedure given above in Example 1, part (b).

EXAMPLE 23

(a) α-Cyclohexyl-β-hydroxy-γ-ethylcaproic acid ($R=C_6H_{11}$, $R'=H$, $R''=CH(C_2H_5)_2$) can be prepared by catalytic hydrogenation of α-phenyl-β-hydroxy-γ-ethylcaproic acid, M.P. 98–100° C. by the manipulative procedure described above in Example 1, part (a).

(b) Hexamethyleniminoethyl α-cyclohexyl-β-hydroxy-γ-ethylcaproate can be prepared by esterification of α-cyclohexyl-β-hydroxy-γ-ethylcaproic acid with hexamethyleniminoethyl chloride according to the manipulative procedure given above in Example 1, part (b).

Example 24

(a) α-(4-Methylcyclohexyl)-β-hydroxy-β-methylbutyric acid ($R=4-CH_3C_6H_{10}$, $R'=CH_3$, $R''=CH_3$) can be prepared by catalytic hydrogenation of α-p-tolyl)-β-hydroxy-β-methylbutyric acid by the manipulative procedure above in Example 1, part (a).

(b) 2-diethylaminopropyl α-(4-methylcyclohexyl)-β-methylbutyrate can be prepared by esterification of α-(4-methyl-cyclohexyl-β-hydroxy-β-methylbutyric acid with 2-diethylaminopropyl chloride according to the manipulative procedure given above in Example 1, part (b).

I claim:

1. A compound selected from the group consisting of compounds having the formula

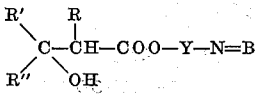

wherein R is a member of the class consisting of the cyclohexyl group and lower-alkyl-substituted cyclohexyl groups, R' is a member of the class consisting of hydrogen, lower-alkyl, 5-8-membered cycloalkyl and lower-alkyl-substituted 5-8-membered cycloalkyl groups, R" is a member of the group consisting of 5-8-membered cycloalkyl, lower-alkyl-substituted 5-8-membered cycloalkyl, lower-alkyl, and lower-alkyl groups joined with R' to form a member of the class consisting of 5-8-membered cycloalkyl groups and lower-alkyl-substituted 5-8-membered cycloalkyl groups, Y is a lower-alkylene bridge in which the free valences are on different carbon atoms, and —N=B is a member of the class consisting of di-lower-alkylamino, polymethylenimino radicals having from 5- to 8-membered rings and morpholino radicals; and acid-addition and quaternary ammonium salts thereof.

2. A compound having the formula

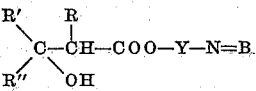

wherein R is cyclohexyl, R' and R" are lower-alkyl groups, Y is a lower-alkylene bridge in which the free valences are on different carbon atoms, and —N=B is a di-lower-alkylamino radical.

3. A compound having the formula

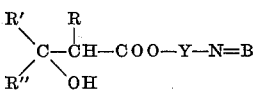

wherein R is cyclohexyl, R' is hydrogen, R" is a lower-alkyl group, Y is a lower-alkylene bridge in which the free valences are on different carbon atoms, and —N=B is a di-lower-alkylamino radical.

4. A compound having the formula

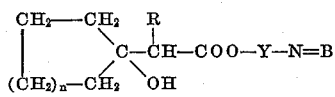

wherein R is a cycloalkyl group, n is an integer from 1 to 4, Y is a lower-alkylene bridge in which the free valences are on different carbon atoms, and —N=B is a di-lower-alkylamino radical.

5. A compound having the formula

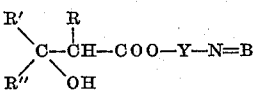

wherein R is cyclohexyl, R' and R" are lower-alkyl groups, Y is ethylene, and —N=B is a di-lower-alkylamino radical.

6. A compound having the formula

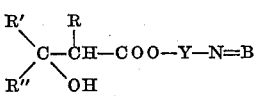

wherein R is cyclohexyl, R' is hydrogen, R" is a lower-alkyl group, Y is ethylene, and —N=B is a di-lower-alkylamino radical.

7. A compound having the formula

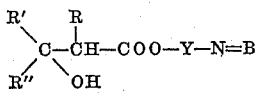

wherein R is cyclohexyl, R' and R" are lower-alkyl groups, Y is ethylene, and —N=B is diethylamino.

8. A compound having the formula

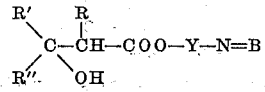

wherein R is cyclohexyl, R' is hydrogen, R" is a lower-alkyl group, Y is ethylene, and —N=B is diethylamino.

9. A compound having the formula

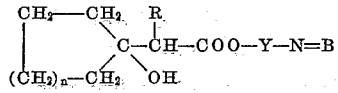

wherein R is cyclohexyl, n is an integer from 1 to 4, Y is ethylene, and —N=B is a di-lower-alkylamino radical.

10. A compound having the formula

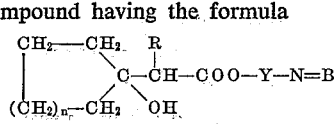

wherein R is cyclohexyl, n is an integer from 1 to 4, Y is ethylene, and —N=B is a diethylamino radical.

11. In the process for the preparation of a compound having the formula

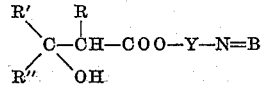

wherein R is a member of the class consisting of the cyclohexyl group and lower-alkyl-substituted cyclohexyl groups, R' is a member of the class consisting of hydrogen, lower-alkyl, 5-8-membered cycloalkyl and lower-alkyl-substituted 5-8-membered cycloalkyl groups, R" is a member of the group consisting of 5-8-membered cycloalkyl, lower-alkyl-substituted 5-8 membered cycloalkyl, lower-alkyl, and lower-alkyl groups joined with R' to form a member of the class consisting of 5-8-membered cycloalkyl groups and lower-alkyl-substituted 5-8-membered cycloalkyl groups, Y is a lower-alkylene bridge in which the free valences are on different carbon atoms, and —N=B is a member of the class consisting of di-lower-alkylamino, polymethylenimino radicals having from 5- to 8-membered rings and morpholino radicals, the steps which comprise selectively catalytically hydrogenating the aromatic ring of a compound having the formula

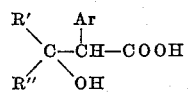

wherein Ar is selected from the class consisting of phenyl and lower-alkyl-substituted phenyl groups, and heating between about 50° C. and 150° C. the resulting acid having the formula

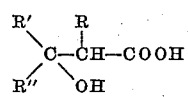

with a tertiary-aminoalkyl halide having the formula Z-Y-N=B wherein Z is halogen.

12. A compound having the formula

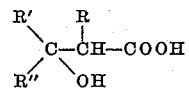

wherein R is a member of the class consisting of the cyclohexyl group and lower-alkyl-substituted cyclohexyl groups, R' is a member of the class consisting of hydrogen, lower-alkyl, 5-8-membered cycloalkyl and lower-alkyl-substituted 5-8-membered cycloalkyl groups, and R" is a member of the group consisting of 5-8-membered cycloalkyl, lower alkyl-substituted 5-8-membered cycloalkyl, lower-alkyl, and lower-alkyl groups joined with R' to form a member of the class consisting of 5-8-membered cycloalkyl groups.

13. A compound having the formula

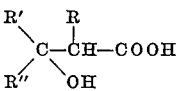

wherein R is cyclohexyl, and R' and R" are lower-alkyl groups.

14. A compound having the formula

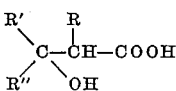

wherein R is cyclohexyl, R' is hydrogen, and R" is a lower-alkyl group.

15. A compound having the formula

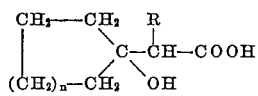

wherein R is cyclohexyl, and $n$ is an integer from 1 to 4.

16. The process for the preparation of a compound having the formula

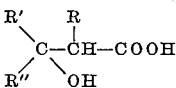

wherein R is a member of the class consisting of the cyclohexyl group and lower-alkyl-substituted cyclohexyl groups, R' is a member of the class consisting of hydrogen, lower-alkyl, 5-8-membered cycloalkyl and lower-alkyl-substituted 5-8-membered cycloalkyl groups, and R" is a member of the group consisting of 5-8-membered cycloalkyl, lower-alkyl-substituted 5-8-membered cycloalkyl, lower-alkyl, and lower-alkyl groups joined with R' to form a member of the class consisting of 5-8-membered cycloalkyl groups and lower-alkyl-substituted 5-8-membered cycloalkyl groups, which comprises selectively catalytically hydrogenating the aromatic ring of a compound having the formula

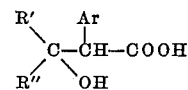

wherein Ar is selected from the class consisting of phenyl and lower-alkyl-substituted phenyl groups.

17. β-Diethylaminoethyl α-cyclohexyl-β-hydroxy-β-methylvalerate.

18. β-Diethylaminoethyl α-cyclohexyl-β-hydroxy-caproate.

19. β-Diethylaminoethyl α-cyclohexyl-α-(1-hydroxycyclopentyl)acetate.

20. β-Diethylaminoethyl α-cyclohexyl-α-(1-hydroxycyclohexyl)acetate.

21. β-Diethylaminoethyl α-cyclohexyl-α-(1-hydroxycycloheptyl)acetate.

22. α-Cyclohexyl-β-hydroxy-β-methylvaleric acid.
23. α-Cyclohexyl-β-hydroxycaproic acid.
24. α-Cyclohexyl-α-(1-hydroxycyclopentyl)acetic acid.
25. α-Cyclohexyl-α-(1-hydroxycyclohenxyl)acetic acid.
26. α-Cyclohexyl-α-(1-hydroxycycloheptyl)acetic acid.

References Cited in the file of this patent

UNITED STATES PATENTS 2,265,184   Miescher et al. _____ Dec. 9, 1941
2,265,185   Miescher et al. _____ Dec. 9, 1941